Sept. 28, 1965    C. W. WOOD ETAL    3,208,734
AERATION OF LIQUIDS

Filed Dec. 11, 1962    4 Sheets-Sheet 1

Inventors:
Charles William Wood
George Francis Gilbert Clough
James William Olson
Arthur Douglas Murphy
by Benj. T. Lauber
attorney Sept. 28, 1965 C. W. WOOD ETAL 3,208,734
AERATION OF LIQUIDS
Filed Dec. 11, 1962 4 Sheets-Sheet 3

Sept. 28, 1965   C. W. WOOD ETAL   3,208,734
AERATION OF LIQUIDS
Filed Dec. 11, 1962   4 Sheets-Sheet 4

United States Patent Office                                    3,208,734
                                                          Patented Sept. 28, 1965

3,208,734
AERATION OF LIQUIDS
Charles W. Wood, Marple Bridge, George F. G. Clough,
  Macclesfield, James W. Abson, Stockport, and Arthur
  Douglas Murphy, Bramhall, England, assignors to
  Simon-Carves Limited, Stockport, England, a British
  company
      Filed Dec. 11, 1962, Ser. No. 243,919
Claims priority, application Great Britain, Jan. 8, 1962,
                      649/62
             18 Claims.  (Cl. 259—111)

This invention relates to the aeration of liquids and is an improvement in the invention described in co-pending application of Alsop and Semple, Serial No. 158,672, filed December 12, 1961, now Patent No. 3,182,972.

The above co-pending application describes and claims an agitator for the aeration of liquids comprising an inverted frusto-conical shell secured adjacent the lower end of a spindle, to the lower end of which is secured an annular boss, a plurality of arms secured to the periphery of said annular boss and extending tangentially of said boss along the lower surface of said frusto-conical shell and outwardly of its outer periphery, and a deflector secured to the outer end of each said arm at right angles thereto, on the upper edge thereof and extending from the outer periphery of said shell to the outer end of each said arm, said deflectors being adapted to lie parallel with, and at substantially the same level as, the surface of the liquid in a container when said agitator is rotated therein for the aeration of said liquid.

The above pending application also describes and claims a liquid aeration device comprising a liquid container, an aerator rotatable about a vertical axis relative to said container and depending thereinto, said aerator comprising an inverted frusto-conical hollow shell having its inner periphery secured adjacent the lower end of a vertical spindle, an annular boss secured to the outer periphery of said spindle at the lower end thereof, a plurality of arms secured tangentially to the outer periphery of said boss and to the lower surface of said hollow shell, each arm extending beyond the outer periphery of said shell, a deflector secured to the upper side of each said arm and extending between the outer end thereof and the outer periphery of said shell, at right angles from each said arm disposed parallel and substantially-coincidentally with the normal level of liquid in said container, and means to rotate said vertical spindle, said frusto-conical shell and said arms in the same direction as that to which said deflectors are projected at right angles from said arms.

The above aerator operates to perform two main functions, in that it enables ambient gases to be absorbed by the liquid in which it is operated, or it permits gases dissolved in that liquid to be liberated to the atmosphere. It also causes a toroidal circulation of the liquid in the vessel in which it is operated.

This aerator has a high efficiency in terms of oxygen input per hour per horse power and from this point of view is well adapted to the aeration of liquids requiring a high oxygen input as, for instance, in a bacteriological effluent treatment system such as that which forms the subject matter of British Patent No. 847,640.

In some aeration processes, however, it is necessary to provide a long retention time with a comparatively low oxygen input. This condition exists, for instance, in sewage treatment plants, and the present invention relates to a combination in which conditions requiring such a long retention time and comparatively low oxygen input are obtained by the aerator of the above co-pending application.

This is achieved by operating the aerator in the upper regions of the liquid in a comparatively large tank or container, and causing it to describe a path around a pivotal point located centrally of the tank or container. This is effected by placing the aerator on an arm rotatable about such central pivot. The aerator may also be mounted on this arm in such manner that it orbits about the end of the arm. These rotational and orbiting effects are caused by reactive forces set up by the rotation of the agitator about its own spindle.

In one form of the invention, however, where it is desired to cause the agitator to describe a substantially square path about the central pivot, the orbiting of the agitator about the end of the arm may be caused to control the rate of rotation of the arm about the central pivot so that the arm completes one revolution of the container whilst the agitator is completing four orbits about the end of the arm; the position of the agitator being adjusted in a square container so that during each orbit it remains at a substantially-constant distance from the sides.

Accordingly, the invention comprises an agitator for the aeration of liquids and means to cause the rotation thereof, rotatably mounted on one end of an arm which is adapted to rotate about a vertical pivot located in a container for the liquid to be aerated, the reactive forces produced by the rotation of the agitator in the liquid causing said arm to rotate about said vertical pivot.

A better understanding of the invention may however be obtained from the following description when this is read with reference to the accompanying drawings, of which:

Figure 1:
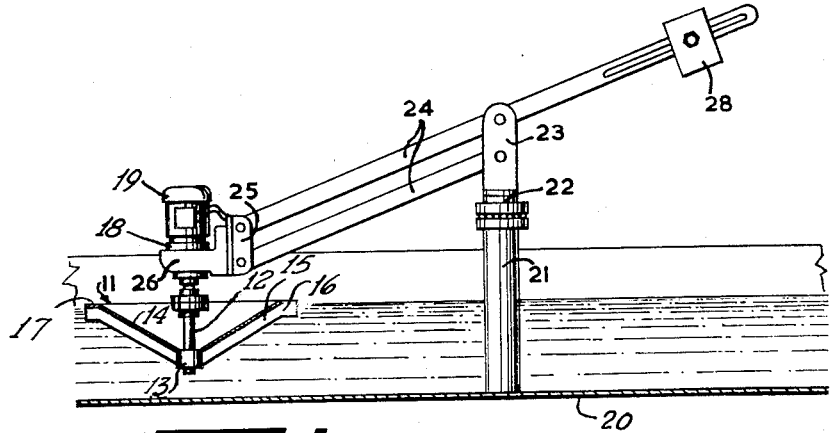
FIG. 1 is a vertical section of an aerator embodying our invention taken on line 1—1 of FIG. 2.

The agitator 11 itself as described and claimed in the co-pending application, comprises a vertical spindle 12 having secured at one end an annular boss 13. A shallow metal inverted frusto-conical shell 14 has its inner periphery secured to the upper end of the annular boss 13 with its outer periphery directed upwardly away therefrom.

A plurality, say six or eight, of agitator arms 15 is secured tangentially to the periphery of the boss 13 at such an upwardly-directed angle that their upper edges follow the contour of the outer surface of the frusto-conical shell 14, to which they are also secured. The arms 15 are thin, flat metal strips, secured by their flat surfaces to the boss 13 and by their upper edges to the shell 14. Each arm 15 extends, as at 16, for a distance beyond the outer periphery of the shell 14 and the upper part of this extension 16 is preferably turned over at 17 to extend from the outer periphery of the shell 14 outwardly to the free end of the extension. Each arm portion 16 continues horizontally with the outer peripheral edge of the shell 14.

Between the outer peripheral edge of the small 14 and the end of each portion 16, a deflector 17 is secured to the upper edge of each arm 15 and to the outer peripheral edge of the shell 14; each deflector 17 being in the form of a plate extending horizontally from an arm portion 16 in one circumferential direction or the other, depending upon the direction in which the agitator 11 is to be rotated; the deflectors 17 extending in the direction of rotation. The deflectors 17 lie parallel with the outer end portion 16 of each arm 15 and horizontal with the peripheral edge of the shell 14.

The vertical spindle 12 of the agitator 11 is secured to the output shaft of a reduction gear box 18 driven by a suitable electric motor 19. Due to its conical shell construction the agitator 11 is almost, or entirely buoyant (depending to a large extent upon the specific gravity of the liquid in which it is to be operated).

As the main purpose of the present invention is to provide a comparatively low rate of oxygenation together with a comparatively long retention time, extreme agitation of the liquid is not required and accordingly, for a given size of agitator 11, a much larger liquid container 20 can be used if means are provided to move the agitator 11 around so that its action is not confined to one particular zone in the container. This is also necessary if surface agitation is required without undue interference with settling or sedimentation within the lower levels of the container.

To enable the agitator or aerator to move in an orbit about a pivotal axis the combination of our invention comprises means to support the agitator and a pivotal support for said means to permit or cause the agitator 11 to rotate around said pivot axis within the container 20, as shown in the different forms of such means as described by way of example only.

As stated hereabove, because of its hollow construction the agitator 11 may be buoyant if the specific gravity of the liquid undergoing aeration is sufficiently high, and in such cases where the agitator rests on the surface of the liquid with the deflectors 17 just above that surface, a simple rotating arrangement can be used.

Figure 2:
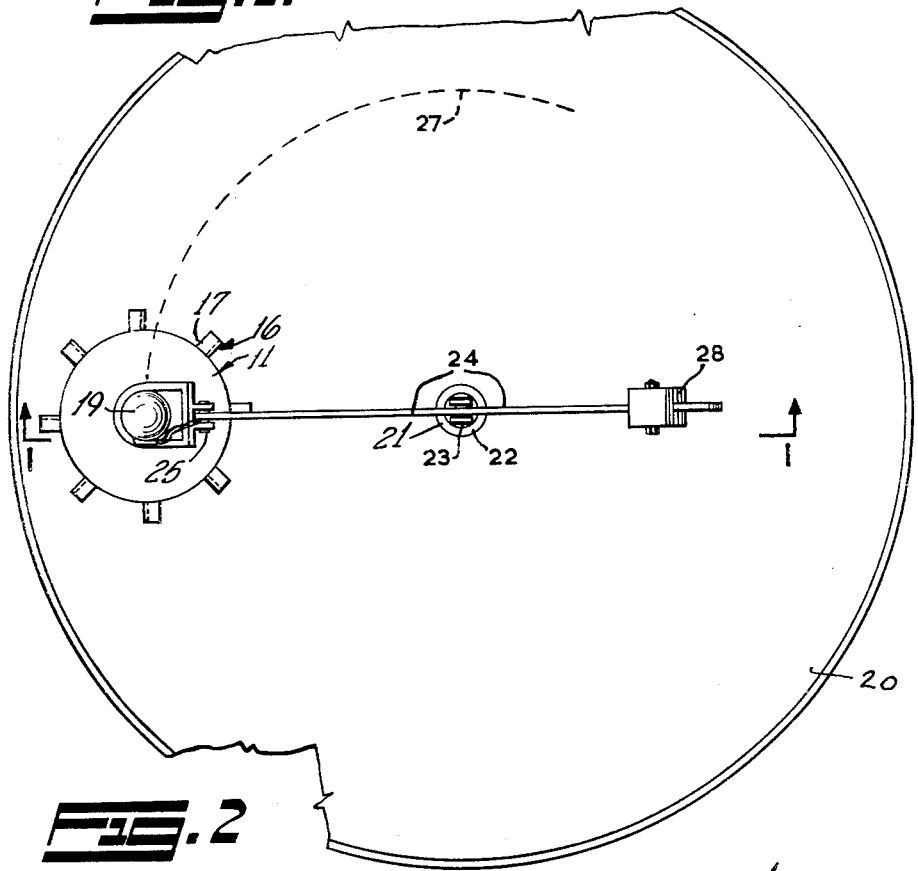
FIG. 2 is a plan of the aerator shown in FIG. 1.

As shown in FIGS. 1 and 2, this comprises a vertical spindle 21 disposed substantially centrally in the container 20 and extending upwards above the level of the liquid therein. A bearing boss 22 is rotatably mounted on the top of this spindle 21, and pivoted between vertically-spaced ears 23 in this boss are the ends of two links 24, the opposite ends of which are pivoted in ears 25 formed in the side of the casing 26 of the agitator motor 19. The links 24 are of identical length and lie parallel with each other between the boss 24 and the agitator motor 19. They thus form a parallel linkage and keep the agitator spindle 12 in a vertical position regardless of the height of liquid in the container 20.

When the agitator 11 is rotating it exerts a thrust against the liquid in the reverse direction to its own rotation and thus causes the boss 22 to rotate about its spindle 21 and the agitator 11 thus rotates around the surface of the liquid in the container in the path of the broken line 27 shown in FIG. 2.

If the specific gravity of the liquid is not sufficiently high to allow the agitator 11 to float on the surface, the upper link 24 may be extended beyond its pivot and be supplied with a suitable counterweight 28. The counterweight 28 is preferably adjustable so that the level of the agitator 11 in the liquid may be adjusted to suit varying conditions of specific gravity and operational needs.

The embodiment described hereabove permits the agitator 11 to rotate in the circular path 27 about the surface of the liquid.

If a greater degree of surface agitation is required the agitator 11 may be caused to describe an epicyclic path on the surface of the liquid.

Figure 3:
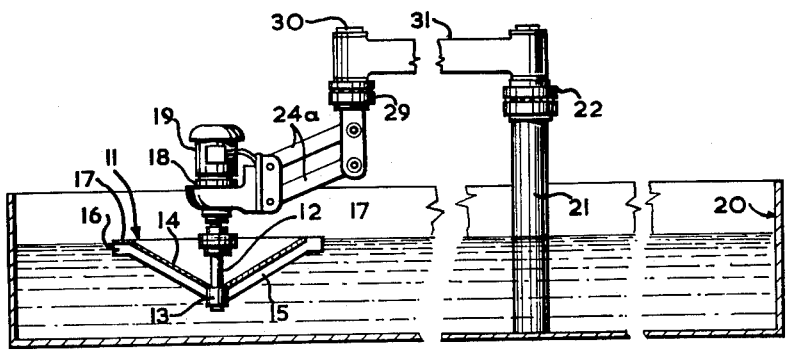
FIG. 3 is a vertical section of a modification of the aerator taken on line 3—3 of FIG. 4.
Figure 4:
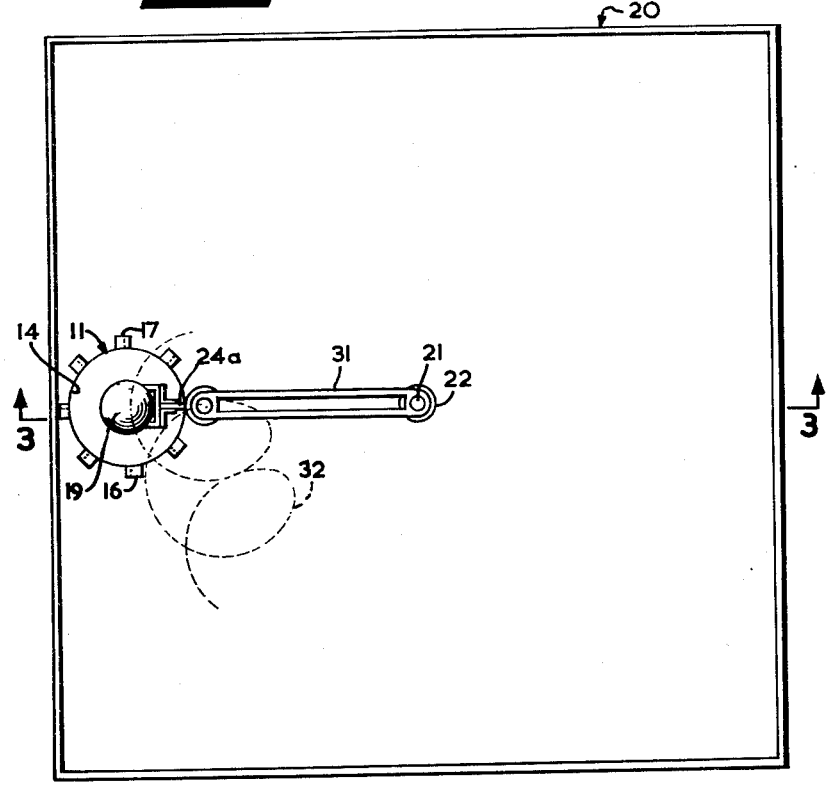
FIG. 4 is a plan of the aerator of FIG. 3.

In this case, as shown in FIGS. 3 and 4, the parallel links 24a from the agitator motor 19 are pivoted to a boss 29 secured to the lower end of an intermediate vertical spindle 30, the upper end of which is rotatable in the end of a horizontal arm 31 which is itself rotatable about the central vertical spindle 21 in the container 20.

Rotation of the aerator 11 will cause it to orbit around the intermediate spindle 30 and this will, in turn, cause the intermediate spindle 30 and agitator 11 to rotate around the central spindle 21, thus causing the agitator 11 to describe an epicyclic path 32 in the container 20.

A suitable counterweight 28, may again be applied to the parallel linkage 24a as necessary.

Figure 5:
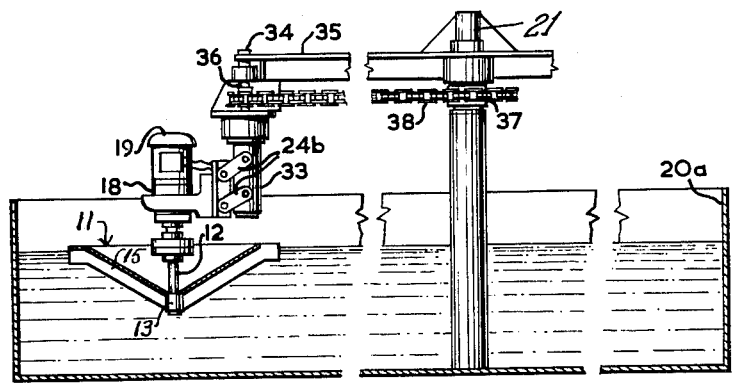
FIG. 5 is a vertical section of another modification of the aerator taken on line 5—5 of FIG. 6.
Figure 6:
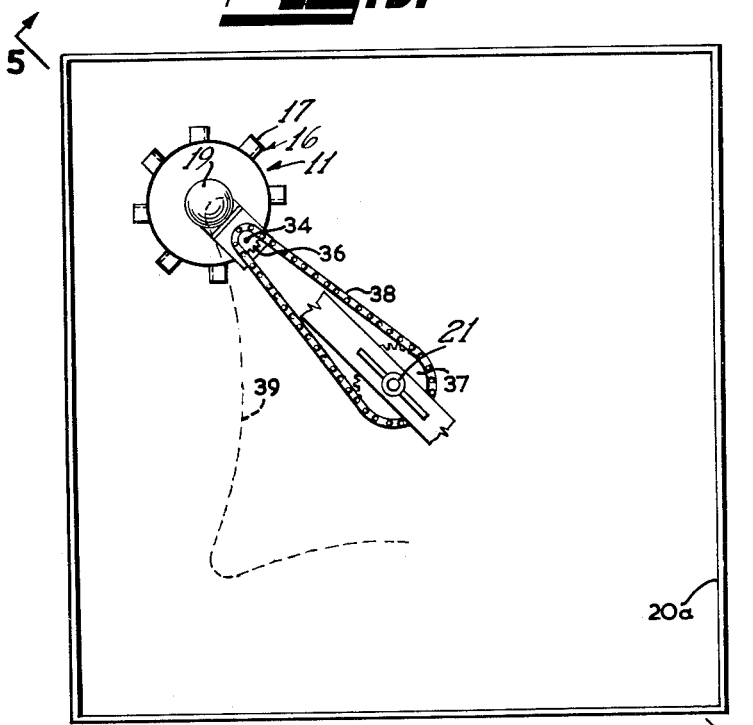
FIG. 6 is a plan of the aerator of FIG. 5.

In the case of a large square container, rotation through a circular path 27 or an epicyclic path 32 may leave substantially "dead" zones in the corners of the containers and a further form of the invention shown in FIGS. 5 and 6 is intended to cause the agitator 11 to describe a substantially-square path within the container.

The agitator 11 itself is precisely as previously described and has the output of the reduction gear box 18 secured to its spindle 12. The casing of the electric motor 19 is connected by a short parallel linkage 24b to a bushing 33 which is secured to the lower end of an intermediate vertical spindle 34 which is rotatably mounted in the end of a horizontal arm 35 which is, in turn, rotatably mounted on the upper end of the vertical spindle 21 secured centrally in the container 20a. The parallel linkage 24b between the agitator 11 and the bushing 33 may be provided with a counterweight if this is necessary to maintain the agitator 11 at its correct level in the liquid.

If the agitator 11 is now operated, it will follow an epicyclic path in the container 20a as in the embodiment of FIGS. 3 and 4 and as it is required that it should describe a substantially square path, it is necessary to relate its orbit about the spindle 34 at the end of the horizontal arm 35 with the rotation of the horizontal arm 35 itself within the container 20a.

For this purpose, a chain sprocket 36 is secured to the intermediate spindle 34 and a co-operating chain sprocket 37 is secured to the central spindle 21 about which the horizontal arm 35 rotates. The sprocket 37 on the central spindle 21 is the larger, in the ratio of 4:1 to the sprocket 36 on the intermediate spindle 34. The sprockets 36, 37 are connected by an endless chain 38 and are "timed" in such a manner that the horizontal arm 35 is directed towards one corner of the square container 20a when the agitator 11 is in the radially-outermost position of its orbit.

When the agitator 11 is operated, its reaction in the liquid causes it to orbit around the axis of the intermediate spindle 34, thus rotating that spindle and the small sprocket 36 and exerting a pull on the endless chain 38 and on the large sprocket 37. The latter sprocket is secured to the central spindle 21 and cannot rotate and the chain 38 thus "walks" around this sprocket and causes the horizontal arm 35 to rotate. As the sprocket ratio is 4 to 1, the horizontal arm 35 rotates once around the container 20a to four orbits of the agitator 11 around the intermediate spindle 34 and this combined rotation causes the agitator 11 in its orbit to move in a substantially square path 39 in the container 20a, this path 39 being so adjusted that it lies substantially parallel to each of the four sides of the square container 20a during one complete revolution of the horizontal arm 35.

Figure 7:
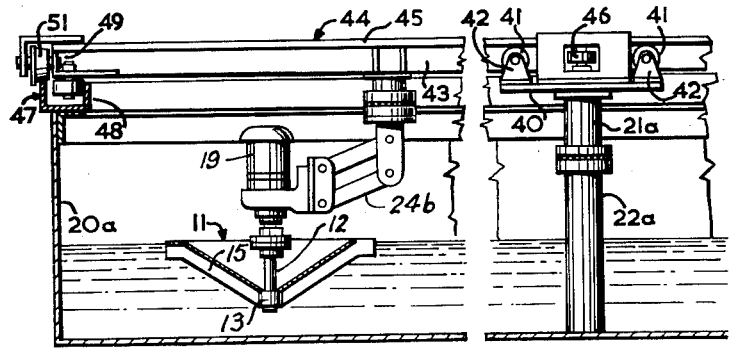
FIG. 7 is a vertical section of another modification of the aerator taken on line 7—7 of FIG. 8.
Figure 8:
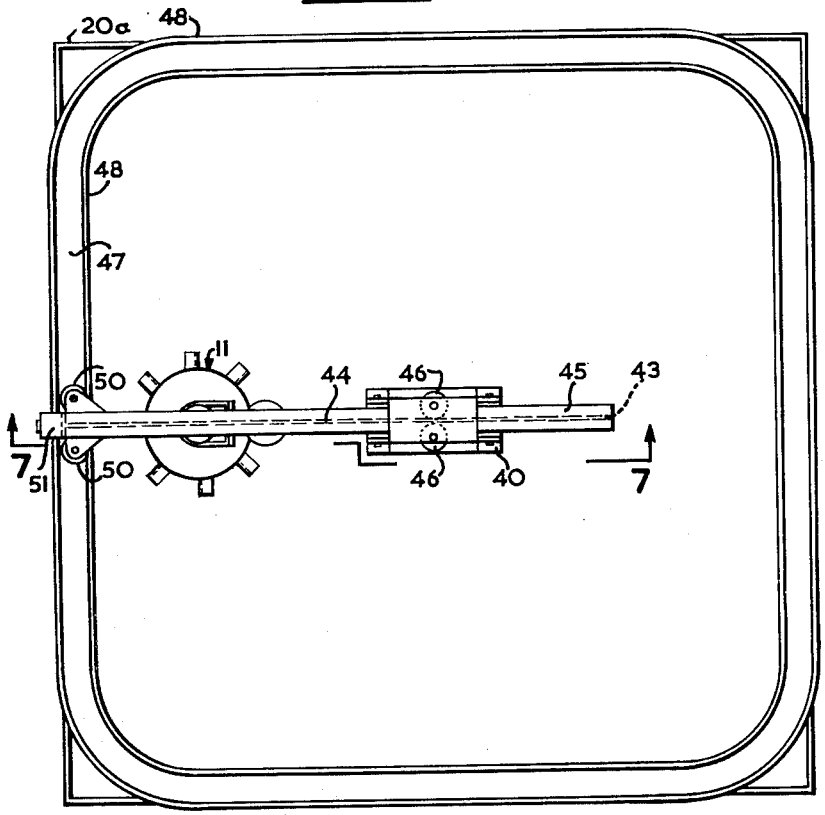
FIG. 8 is a plan of the aerator shown in FIG. 7.

In the further form of the invention the agitator 11 is shown in FIGS. 7 and 8 to be positively guided in a substantially square path within the container.

The central vertical spindle 21a is rotatable within a pipe-like vertical bushing 22a secured in the container and, at its upper end, has a horizontal plate secured thereto form a cross-head or T 40. Suitable low friction bearings 41 are mounted in vertical ears 42 at each end of this cross-head 40, with their axes horizontal, two at each end of the cross-head 40 and so spaced that the web 43 of a T-section boom or horizontal arm 44 may pass between them and that cross-bar 45 of this T-section horizontal arm 44 may rest on the peripheries of the opposite bearings 41. Between the bearings 41 on each side of the cross-head are disposed two further low friction bearings 46, one on each side of the cross-head 40 with their axes vertical, so that the web 43 of the T-section arm 44 may engage their peripheries and thus prevent the arm 44 from binding against the sides of the first-named low-friction bearings 41.

Around the upper edge of the square container 20a is arranged a closed trackway 47 formed from channel-section bars disposed with the webs 48 of the channels uppermost, the trackway 47 following the lines of the four sides of the container 20a but being rounded at each corner.

The T-section arm 44 is of sufficient length to allow one free end 49 to lie above the rounded corners of the trackway 47 whilst still allowing its other end to be engaged by all the bearings 41, 46 in the cross-head 40 of the central spindle 21a.

At the outer free end 49 of the T-section arm 44 are located further low friction bearings 50, 51. One, or a pair 50, of these is (are) disposed to engage with either vertical web 48 of the channel trackway 47 within the channel, and the other bearing 51 is disposed with its axis horizontal so that its periphery rests upon the upper edge of one of the webs 48 of the channel trackway 47.

The agitator 11, which is precisely as previously described, is secured to the T-section arm 44 and may be arranged either to rotate about a fixed axis as in the embodiment of FIGS. 1 and 2 or to orbit as in FIGS. 3 and 4 and in either case will be arranged as previously described in relation to those respective drawings.

When the agitator 11 is rotated on the surface of the liquid, the reactive forces set up cause the T-section arm 44 to rotate in the container 20a as is the case with the arms in other described embodiments. In this case, however, the outer end 49 of the arm 44 is constrained, by the bearings 50 engaging the channel trackway 47, to follow a substantially-square path and the arm 44 thus moves backwards and forwards on and between the bearings 41, 46 on the cross-head 40 of the central spindle 21a and thus carries the agitator 11 in a path equivalent to that of the substantially-square trackway 47.

In operation, the agitator 11 is rotated at speeds preferably between 30 and 300 r.p.m. Due to the tangential aspect of the arms 15 relative to the annular boss 13, and the upward angle of the lower surface 14 of the cone, liquid is drawn upwards and outwards along the lower surface of the cone; the deflectors 17 preventing the liquid from being thrown upwards in a high trajectory.

During rotation, the flow of liquid is upwards and outwards from the centre of the tank or other container towards its upper outer edge so that a substantially toroidal circulation develops and the whole of the liquid is progressively circulated through the air in the zone of slight turbulence at the surface thereof. At the same time, the agitator arm rotates about the centre spindle and the period of dwell of the agitator in any one place is thus limited.

Although not in any way limited to such use, the invention is particularly adapted for the aeration of effluent liquor in the bacterial effluent treatment plant of our British Patent No. 847,640.

The agitator 11 may have the deflectors 17 adjustably secured to arms in the manner described in the specification of our co-pending British application for a patent of Addition No. 44,129/61.

What we claim is:

1. Apparatus for aerating a liquid which comprises a central support, a supporting arm rotatably mounted on said central support and extending therefrom over the surface of a body of liquid to be aerated to rotate about a vertical axis on said support, and an agitator mounted on said arm at a distance from said axis, said agitator comprising a shell of inverted conical shape suspended from said arm and rotatable on a vertical axis and having agitator arms secured on the under surface of said shell and extending from a point adjacent said vertical axis of said shell outwardly to the edge of said shell and thence horizontally outwardly therefrom.

2. The apparatus of claim 1 having a horizontal deflector extending sidewise from the upper portion of each agitator arm.

3. The apparatus of claim 2 having a motor mounted on said supporting arm above said agitator and connected to said shell to rotate said shell.

4. The apparatus of claim 2 having a central boss on said shell and in which said agitator arms are tangential to said boss.

5. The apparatus of claim 2 comprising a container for the liquid and in which said central support extends upwardly from the bottom of said container.

6. The apparatus of claim 2 in which said supporting arm extends transversely on opposite sides of said central support and is pivoted on a horizontal axis on said support and in which said apparatus comprises a conuterweight on said arm on the side of said support opposite to said agitator.

7. The apparatus of claim 2 in which said supporting arm comprises a pair of links pivoted at vertically spaced distances to said agitator to permit said agitator to float on the liquid at variable heights.

8. The apparatus of claim 2 in which said supporting arm comprises an inner portion extending radially from said central support, a rotatable spindle mounted on said inner portion and extending vertically downwardly from said inner portion parallel to the axis of rotation of said inner portion and an outer portion mounted on and rotatable about the axis of said spindle and carrying said agitator to permit said agitator to rotate about said spindle.

9. The apparatus of claim 8 in which said outer portion of said supporting arm comprises a pair of links one above the other pivoted on horizontal axes to said spindle and to said agitator to permit raising and lowering said agitator.

10. The apparatus of claim 8 comprising a chain sprocket secured to the central support, a chain sprocket secured to said rotatable spindle, and a chain trained about said sprockets, the diameter of said sprocket secured on said central support being a multiple of the diameter of said sprocket secured to said spindle to cause said agitator to move successively to the corners of a polygon.

11. The apparatus of claim 10 in which the diameter of the sprocket fixed to the central support is four times the diameter of the sprocket fixed to the spindle.

12. The apparatus of claim 8 which comprises a rectangular liquid container in which said central support is centrally mounted, a horizontal track extending alongside the walls of said container and in a curved path at the corners between said walls, said supporting arm extending to said track and means fixed on said supporting arm and slidably engaging said track, said central support having horizontal guide ways in which said supporting arm is slidably mounted to permit said agitator to move alongside the walls of said container from corner to corner.

13. The apparatus of claim 12 in which said central support comprises a rotatable central spindle and a cross-head in which said guide ways are supported and in which said supporting arm slides horizontally.

14. The apparatus of claim 13 in which said cross-head has horizontally spaced low-friction bearings slidably supporting said supporting arm.

15. The apparatus of claim 13 in which said cross-head has a pair of low-friction bearings one on each side of said supporting arm to guide said supporting arm.

16. Apparatus for aerating a liquid which comprises a central support, a bearing boss rotatably supported on said central support to rotate on a vertical axis, an arm mounted on said bearing boss and extending from said bearing boss over the liquid to be aerated, and an agitator rotatably mounted on said arm on an axis parallel to the vertical axis of said supporting arm and comprising a vertical spindle rotatable on an axis parallel to the vertical axis of said support, an inverted frusto-conical shell mounted on said spindle below said supporting arm, a plurality of agitator arms secured to the under surface of said shell and extending from the axis of said shell to the edge thereof and horizontally outwardly beyond the edge of said shell and having horizontal deflectors on the upper edge of each said agitator arm beyond the periphery of said shell.

17. The apparatus of claim 16 having a motor to rotate said spindle and shell.

18. The apparatus of claim 16 in which said supporting arm comprises a pair of parallel links in a vertical plane secured at one end to said bearing boss and at the other end to said agitator.

References Cited by the Examiner
UNITED STATES PATENTS

| | | | |
|---|---|---|---|
| 2,319,752 | 5/43 | Smith et al. | 261—84 |
| 2,345,163 | 3/44 | Vollrath | 259—102 |
| 2,416,352 | 2/47 | Seward | 104—98 |
| 2,504,290 | 4/50 | Wood | 104—163 |
| 2,796,241 | 6/57 | Lhota | 261—91 |
| 3,114,622 | 12/63 | Hardy | 259—102 |

FOREIGN PATENTS

| | | |
|---|---|---|
| 562,676 | 12/57 | Belgium. |
| 560,897 | 7/58 | Canada. |
| 1,205,301 | 8/59 | France. |
| 615,384 | 1/49 | Great Britain. |
| 84,860 | 1/55 | Norway. |

HARRY B. THORNTON, *Primary Examiner.*

RONALD R. WEAVER, *Examiner.*